United States Patent [19]

LoBosco et al.

[11] Patent Number: 5,252,028
[45] Date of Patent: Oct. 12, 1993

[54] MARINE PROPELLER ASSEMBLY WITH SHOCK ABSORBING HUB AND EASILY REPLACEABLE PROPELLER HOUSING

[76] Inventors: Sam LoBosco; John LoBosco, both of 702 S. Emerson Dr., Mt. Prospect, Ill. 60056

[21] Appl. No.: 944,360
[22] Filed: Sep. 14, 1992
[51] Int. Cl.[5] .................................... B63H 1/20
[52] U.S. Cl. ................... 416/93 A; 416/134 R; 416/135; 416/244 B; 440/52; 464/89; 464/180
[58] Field of Search ............ 416/93 A, 131, 134 R, 416/135, 244 B, 245 A; 440/52, 78, 83; 464/75, 89, 180, 182, 901; 403/259, 261

[56] References Cited

U.S. PATENT DOCUMENTS

| | | | |
|---|---|---|---|
| 1,906,057 | 4/1933 | Guy | 464/89 |
| 2,956,187 | 10/1960 | Wood | 464/89 |
| 3,002,266 | 10/1961 | Lynn et al. | |
| 3,563,670 | 2/1971 | Knuth | |
| 3,764,228 | 10/1973 | Shook | |
| 3,865,509 | 2/1975 | Frazzell et al. | |
| 3,876,331 | 4/1975 | DenHerder et al. | |
| 4,417,852 | 11/1983 | Costabile et al. | |
| 4,452,591 | 6/1984 | Fishbaugh et al. | 416/93 A |
| 4,566,855 | 1/1986 | Costabile et al. | |
| 4,802,822 | 2/1989 | Gilgenbach et al. | |
| 4,842,483 | 6/1989 | Geary | |
| 5,022,875 | 6/1991 | Karis | 440/83 |
| 5,201,679 | 4/1993 | Velte, Jr. et al. | 416/134 R |

FOREIGN PATENT DOCUMENTS

| | | | |
|---|---|---|---|
| 0441009 | 8/1974 | U.S.S.R. | 464/89 |
| 201198A | 8/1988 | United Kingdom | |

Primary Examiner—Edward K. Look
Assistant Examiner—Christopher Verdier
Attorney, Agent, or Firm—Leydig, Voit & Mayer

[57] ABSTRACT

A shock absorbing hub for a marine propeller assembly includes an inner spindle telescoped onto the splined drive shaft of the engine, an outer sleeve spaced radially outwardly of the spindle, and a molded-in-place core of elastomeric material filling the space between the spindle and the sleeve to transmit torque between the two while cushioning torsional shock. A housing carrying propeller blades is keyed to the outer sleeve and may be removed therefrom for repair or replacement without taking any retaining components off of the drive shaft.

13 Claims, 3 Drawing Sheets

MARINE PROPELLER ASSEMBLY WITH SHOCK ABSORBING HUB AND EASILY REPLACEABLE PROPELLER HOUSING

BACKGROUND OF THE INVENTION

The present application relates generally to marine propellers and, more particularly, to propellers of the type which have shock absorbing hubs.

Propellers used in many inboard and outboard pleasure boats are mounted on the splined drive shaft of the engine by a hub having a rubber shock absorbing element which dampens sudden changes in rotational torque applied to the propeller or the shaft, such as upon changing between forward and reverse directions or upon the propeller striking an obstruction.

In many conventional propellers, the shock absorbing hub commonly is permanently press fit into a blade-supporting propeller housing, such as by use of a high tonnage press, so as to insure that the propeller housing will be maintained in proper torque-transmitting relation with the hub. When the propeller is damaged, as frequently occurs in pleasure boating activities, the entire propeller housing and hub assembly must be removed in order to effect repair or replacement. This first requires removing a retaining nut assembly from the drive shaft. In instances where efforts are made to make such repair or replacement when the boat remains in open water, it is easy to drop the nut or associated washers and lose those components in the water. Repair of the propeller can be costly, and because of the relative complexity of propellers with such shock absorbing mountings, it commonly has not been economical to maintain a replacement propeller on board recreational and pleasure boats.

Apart from the problem of replacing damaged propellers, boat owners often desire to selectively use propellers with differently pitched blades for particular boating uses. For example, a propeller having blades of one pitch may be desirable for pleasure cruising while a propeller with blades of a significantly different pitch is preferred for water skiing. Heretofore, the significant cost of extra propellers, as well as the inconvenience of changing propellers, has impeded boat owners from being able to selectively utilize the optimum propeller for particular boat usage.

SUMMARY OF THE INVENTION

The general aim of the present invention is to provide a boat propeller having a shock absorbing hub and capable of relatively easy and economical repair and replacement.

A related object of the invention is to provide a propeller in which a propeller blade assembly may be quickly and easily removed and re-installed on a shock absorbing hub.

A more detailed object of the invention is to provide a propeller in which the blade assembly may be replaced without need of removing a retaining nut assembly from the drive shaft.

A further object is to provide a propeller of the foregoing type in which a damaged blade assembly may be removed by a person on board the boat with little risk of dropping and losing the retaining nut and associated washers in the water.

Yet another object is to provide a propeller blade assembly which can be replaced at a cost less than that required to repair conventional damaged propellers.

Still another object is to provide a propeller arrangement which makes it economical to maintain a replacement propeller blade assembly on board for emergency use, or to maintain on board one or more blade assemblies with differently pitched blades for particular boating usage.

These and other objects and advantages of the invention will become more apparent from the following detailed description when taken in conjunction with the accompanying drawings.

DETAILED DESCRIPTION OF THE PREFERRED EMBODIMENTS

Figure 1:
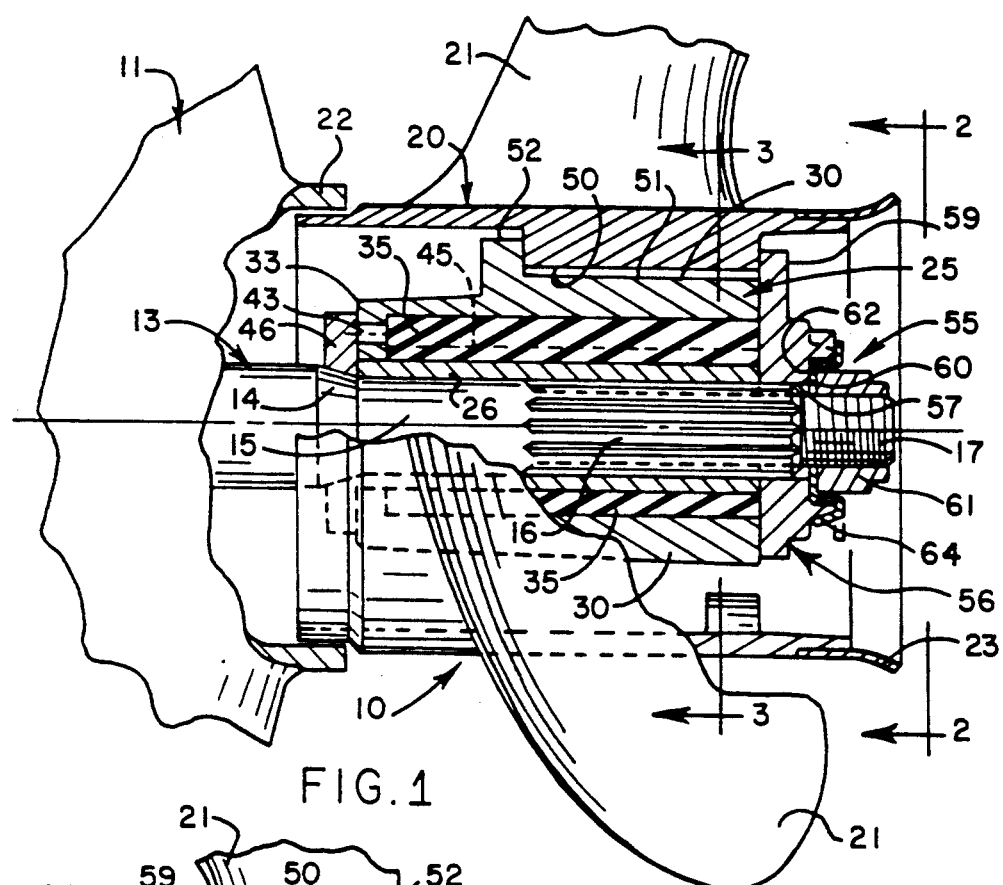
FIG. 1 is a fragmentary side elevational view of a typical marine engine equipped with a new and improved propeller assembly incorporating the features of the present invention.

For purposes of illustration, the invention has been shown in the drawings as incorporated in a propeller assembly 10 for use with a marine engine 11 which may be either an inboard or outboard engine of the type conventionally used with pleasure boats. The engine includes a rotatable propeller shaft 13 with an outwardly tapered portion 14, a smooth cylindrical portion 15, an externally splined portion 16 and an externally threaded outer end portion 17 immediately adjacent the outer end of the splined portion.

The propeller assembly 10 includes a tubular propeller housing 20 adapted to be rotated by the shaft 13 and carrying a plurality (herein, three) of angularly spaced propeller blades 21 which may be appropriately pitched according to the particular usage of the boat. At its inner end, the housing 20 is received within the exhaust cowl 22 of the engine 11. The outer end portion of the housing supports an outwardly flared diffuser ring 23 which discharges exhaust gases rearwardly during operation of the propeller assembly 10 in the forward direction.

The present invention contemplates the provision of a new and improved hub 25 which transmits torque from the shaft 13 to the blade housing 20 while absorbing torsional shock between the two and which permits quick and relative trouble-free removal and replacement of the blade housing. The hub 25 is particularly characterized in that it permits the blade housing to be removed while the boat is in the water and without any significant risk of dropping and losing any retaining components off of the shaft 13.

More specifically, the hub 25 includes a central tubular spindle 26 whose inner peripheral surface is formed with smooth and splined portions, the smooth portion of the spindle having substantially the same length as the smooth portion 15 of the shaft 13. The outer peripheral surface of the spindle 26 is generally cylindrical.

Figure 3:
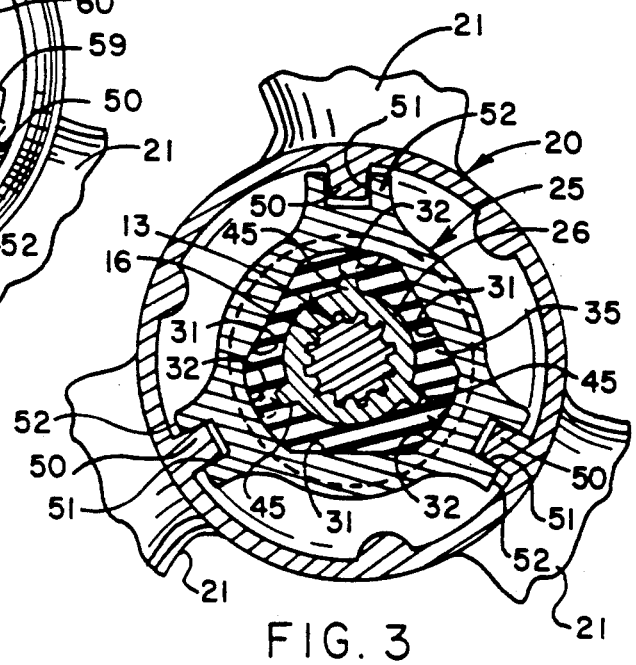
FIG. 3 is a fragmentary cross-section taken substantially along the line 3—3 of FIG. 1.

A sleeve 30 surrounds the spindle 26 and is disposed in radially outwardly spaced relation with the outer peripheral surface of the spindle. The inner peripheral surface of the sleeve is generally tri-lobal in shape. Thus, the inner peripheral surface of the sleeve is formed with three equally spaced straight sides 31 (FIG. 3) which lie along the three legs of an imaginary equilateral triangle. Adjacent ends of each pair of adjacent straight sides 31 are connected by a generously radiused arcuate side 32. An annular flange 33 (FIGS. 1 and 4) is formed integrally with and projects radially inwardly from the inner end of the sleeve 30 and extends to the outer peripheral surface of the spindle 26.

Figure 9:
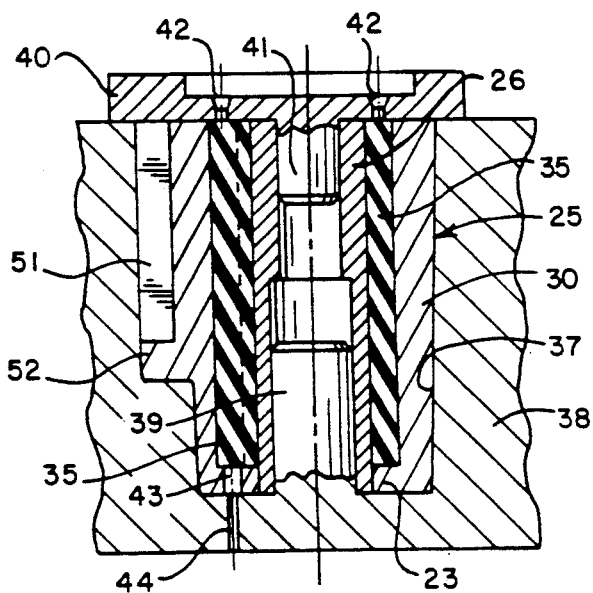
FIG. 9 is a schematic cross-sectional view of a mold used in the manufacture of the shock absorbing hub.

Advantageously, a core 35 of elastomeric material (e.g., 65-80 durometer rubber) fills the space between the spindle 26 and the sleeve 30 in order to transmit torque from the spindle to the sleeve while cushioning shock when the shaft 16 rapidly accelerates or changes directions or when the propeller blades 21 strike an obstacle. Preferably, the core 35 is molded around the spindle 26 and into the sleeve 30 by an injection molding set-up of the type illustrated in FIG. 9. As shown, the sleeve 30 is placed in the cavity 37 of a mold 38 having a lower, upwardly projecting rod 39 onto which the spindle 26 is fixtured in radially spaced relation from the sleeve. A releasable upper cap 40 closes the upper end of the cavity and includes a downwardly projecting rod 41 which also fixtures the spindle. Hot flowable rubber is shot through gates 42 in the cap 40 under high pressure and fills the space between the spindle 26 and the sleeve 30 so as to form the core 35, the latter having internal and external peripheral surfaces corresponding in shape to the external and internal peripheral surfaces of the spindle and the sleeve, respectively. Holes 43 and 44 in the flange 33 and the mold 38, respectively, vent the mold as the rubber is injected into the gates 42 and prevent the spindle from being damaged by high pressure.

Before being placed in the mold 38, the spindle 26 and the sleeve 30 are degreased and are sprayed with an adhesive which causes the rubber to bond to those components. In addition, the rubber is vulcanized by the heat and pressure and, upon cooling, becomes intimately and strongly attached to the spindle and the sleeve. To enhance the torque-transmitting capability between the spindle 26 and the core 35, three angularly spaced and axially extending ribs 45 (FIG. 3) are formed on the outer peripheral surface of the spindle and become embedded in the inner peripheral surface of the core during the molding operation Thus, the hub 25 is a unitary assembly defined by the inner spindle 26, the intermediate core 35 and the outer sleeve 30. Prior to assembling the hub with the shaft 13, a thrust washer 46 (FIG. 1) with a tapered hole is slipped onto the shaft and seats against the tapered portion 14 of the shaft. Thereafter, the hub is slipped onto the shaft until the inner end of the hub stops against the thrust washer. In the assembled position of the hub 25, the smooth portion of the spindle 26 surrounds the smooth portion 15 of the shaft 13 while the splined portion of the spindle mates with the splined portion 16 of the shaft. As shown most clearly in FIG. 1, the splined portion 16 of the shaft is somewhat longer than the splined portion of the spindle and thus a short section of the splined portion of the shaft projects outwardly from the spindle.

Figure 6:
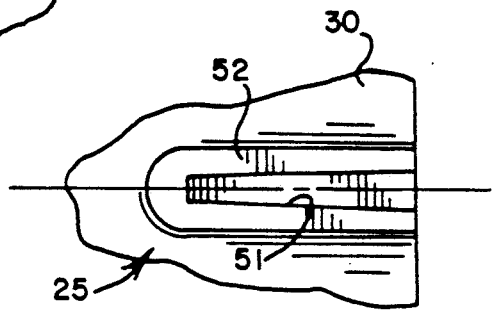

In keeping with the invention, the propeller housing 20 is adapted to be assembled into torque-transmitting relation with the hub 25 by slipping the housing axially onto the hub from the outer end thereof. For this purpose, three angularly spaced and axially extending keys 50 are formed integrally with and project radially inwardly from the inner peripheral surface of the blade housing 20 about midway between the ends of the housing. The keys are adapted to slip into and mate with three angularly spaced and axially extending keyways 51 formed in lobes 52 projecting radially outwardly from the sleeve 30. The keyways 51 open axially out of the outer end of the sleeve and taper slightly upon progressing toward the inner end of the sleeve (see FIG. 6). The keys 50 taper in a similar manner and tend to wedge into the keyways as the housing is slipped onto the hub.

Figure 2:
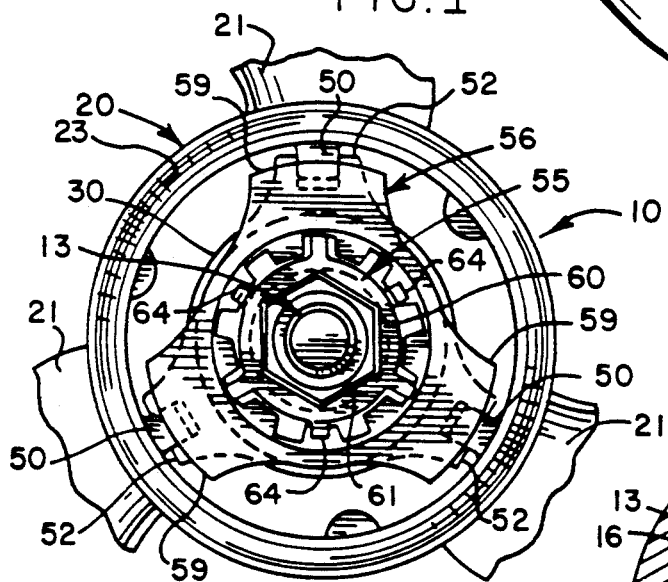
FIG. 2 is a fragmentary end view of the outer end of the propeller assembly as seen along the line 2—2 of FIG. 1.

Pursuant to the invention, the shaft 13 is provided with a retainer assembly 55 which normally captivates the propeller housing 20 axially on the hub 25 and which, without being removed from the shaft, may be released to permit the propeller housing to be slipped off of the hub. Herein, the retainer assembly 55 includes a retainer disc or washer 56 formed with a splined inner bore 57 which normally receives and mates with the outwardly projecting section of the splined portion 16 of the shaft 13. The retainer washer 56 also is formed with three angularly spaced ears 59 which normally engage the outer ends of the keys 50 and cover the outer ends of the keyways 51 as shown in FIGS. 1 and 2 in order to prevent the keys from slipping axially out of the keyways. By sliding the retainer washer 56 off of the splined portion 16 of the shaft 13 and onto the threaded portion 17 thereof and by then turning the washer to a released position shown in FIG. 5, the ears 59 uncover the keys 50 and unblock the keyways 51 to permit the housing 20 to be slipped axially off of the hub 25.

Figure 7:
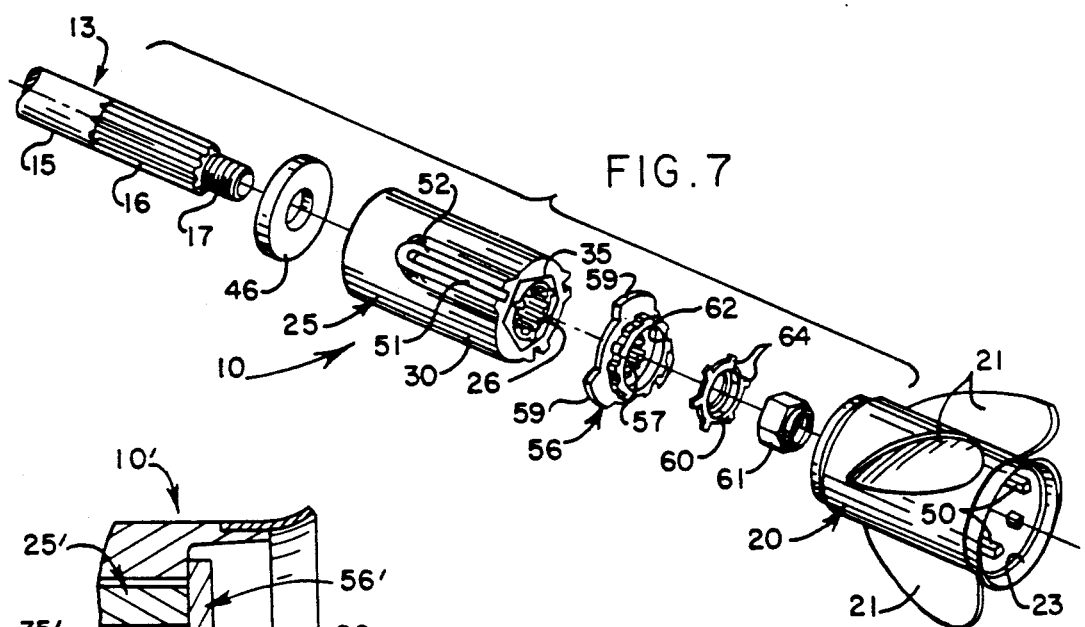
FIG. 7 is an exploded perspective view of the propeller assembly.

To hold the retainer washer 56 in its active or normal captivating position, the retainer assembly 55 includes a spoked washer 60 (FIG. 7) and a hexagonal locking nut 61. The spoked washer 60 includes a generally cup-shaped portion adapted to fit within a pocket 62 (FIG. 7) in the outer side of the retainer washer 56. The interior of the cup-shaped portion receives the nut 61 and is hexagonal in shape so as to prevent relative turning of the nut and the washer 60. Angularly spaced spokes 64 project radially from the lip of the cup-shaped portion of the washer 60 and are adapted to be aligned with angularly spaced notches formed in the castellated outer end of the washer 56. Once the nut 61 has been tightened on the threaded end portion 17 of the shaft 13, three of the spokes 64 are bent into the notches to prevent the washer 60 from turning on the shaft and thus prevent loosening of the nut 61.

Figure 4:
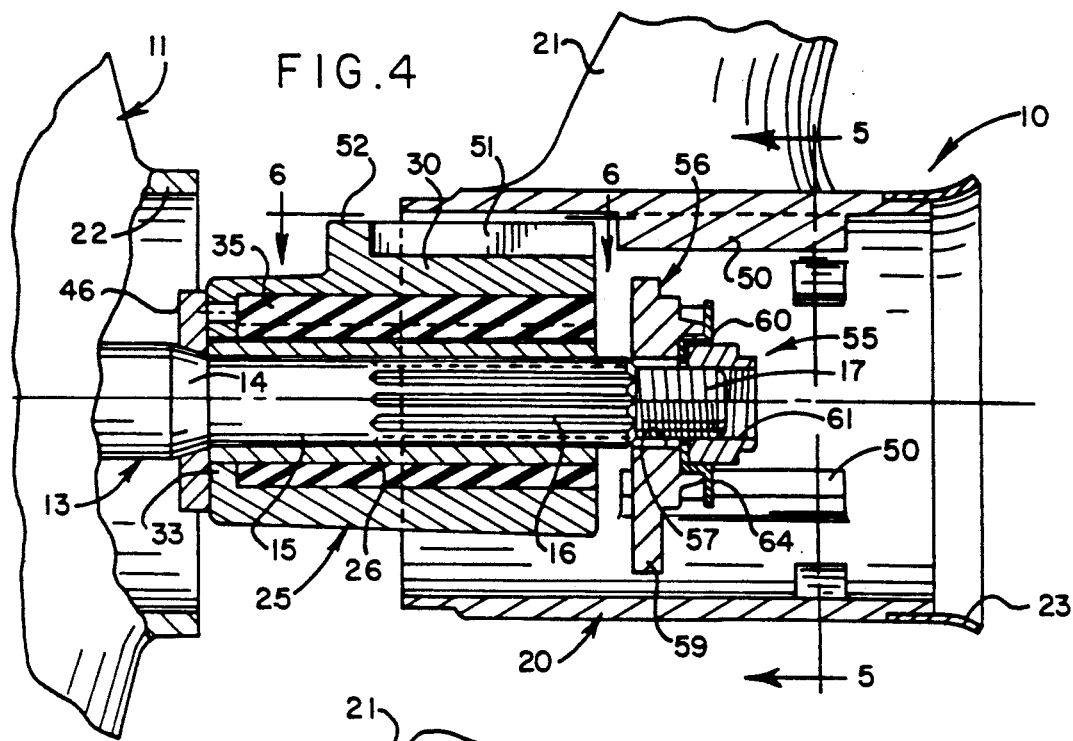
FIG. 4 is a view generally similar to FIG. 1 but shows the propeller blade housing being assembled with the shock absorbing hub.
Figure 5:
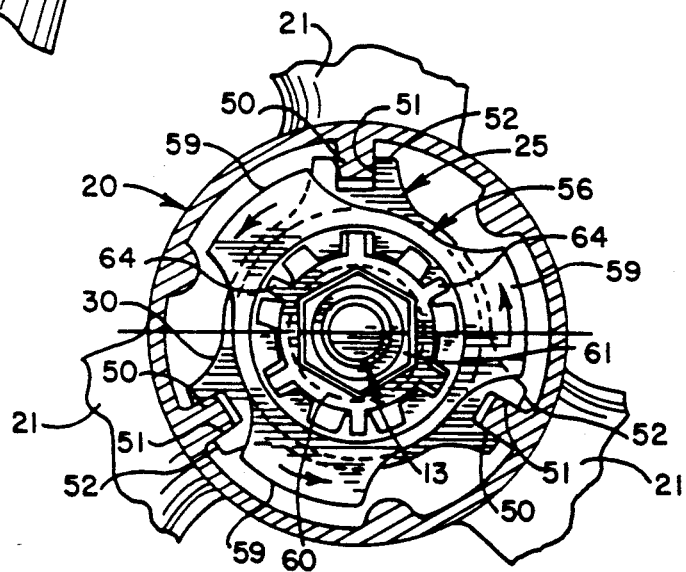
FIGS. 5 and 6 are fragmentary cross-sections taken substantially along the lines 5—5 and 6—6, respectively, of FIG. 4.

The ease with which the propeller housing 20 may be removed is most clearly apparent from a comparison of FIGS. 1 and 2 with FIGS. 4 and 5. First, the spokes 64 of the washer 60 are bent outwardly from the notches of the retaining washer 56 so as to free the washer 60 and the nut 61 for turning on the threaded portion 17 of the shaft 13. Thereafter, the nut is loosened and is threaded outwardly a sufficient distance along the threaded portion 17 to permit the retainer washer 56 to be slipped outwardly off of the outer end of the splined portion 16 to the position of FIG. 4. It is important to note that the retainer washer may be moved to the position of FIG. 4 without need of taking the nut 61 off of the shaft 13 and thus there is no danger of the nut and the washers 56 and 60 being dropped and lost in the water.

After the retainer washer 56 has been shifted outwardly to the position of FIG. 4 and is free of the splined portion 16 of the shaft 13, it is rotated to the released position shown in FIG. 5 to cause the ears 59 to move out of blocking relation with the keys 50. Thereafter, the propeller housing 20 may be removed from the hub 25 simply by pulling axially on the housing to cause the keys 50 to slip out of the exposed outer ends of the keyways 51.

Installation of the propeller housing 20 is effected by following a reverse procedure. With the retainer assembly 55 positioned as shown in FIGS. 4 and 5, the housing 20 is slipped axially inwardly onto the hub 25 to cause the keys 50 to enter the keyways 51. The retainer washer 56 is turned to a position in which the ears 59 are aligned angularly with the keyways 51 and then is slipped inwardly onto the splined portion 16 of the shaft 13 so as to be held angularly in that position. The nut 61 then is tightened to a position in which three of the spokes 64 of the washer 60 are aligned with three of the notches in the retaining washer 56. The spokes then are bent from the phantom line position of FIG. 1 to the solid line position in order to lock the washer 60 and the nut 61 against turning relative to the washer 56.

Accordingly, it is a relatively simple matter to install and remove the propeller housing 20. If the housing should become damaged, only the housing need be replaced and not the hub 25. Thus, it is economical to carry a spare housing on board in the event of an emergency on the water. Also, a housing with blades 21 of a different pitch may be carried on board if the boater wishes, for example, to substitute a water skiing propeller with a 17" pitch for a standard propeller with a 19" pitch.

Because of the tri-lobal configuration of the elastomeric core 35, it is virtually impossible for the core to slip or change positions in the sleeve 30 and lose torque. At the same time, the elastomeric core is capable of torsionally winding up and yielding as necessary to absorb torsional shock. Thus, the shaft 13 and the propeller housing 20 are protected against damage.

Figure 8:
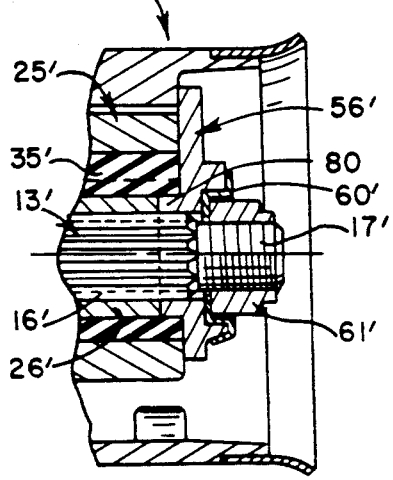
FIG. 8 is a fragmentary view generally similar to FIG. 1 but shows a modified retainer for captivating the propeller blade housing on the shock absorbing hub.

FIG. 8 shows a propeller assembly 10' with a modified hub 25' for use with a shaft 13' having a relatively short splined portion 16'. In this instance, the outer end of the spindle 26' terminates short of the outer end of the core 35' so that an annular opening is defined between the splined portion of the shaft and the outer end of the core. An internally splined boss 80 is formed integrally with and projects axially from the inner face of the retaining washer 56' and is piloted into the annular opening. The boss 80 establishes a splined connection between the retaining washer 56' and the shaft 13' even though the splined portion 16' of the shaft is relatively short. With the exception of the shorter spindle and the different retainer washer, all components of the propeller assembly 10' of FIG. 8 are identical to those of the first embodiment.

We claim:

1. A marine propeller assembly adapted to be attached to a power-rotated shaft having an externally splined portion and having an externally threaded outer end portion located adjacent said splined portion, said assembly comprising an internally splined, shock absorbing hub adapted to be telescoped onto the splined portion of said shaft, said hub having an outer peripheral surface and an axially facing outer end, an axially extending keyway formed in the outer surface of said hub and opening out of the outer end of said hub, a tubular propeller housing having a plurality of angularly spaced propeller blades, said housing having an inner peripheral surface with an axially extending and radially inwardly projecting key having an axially facing outer end, said key interfitting with said keyway to couple said housing for rotation with said hub, a retainer having an internally splined hole, said retainer normally being telescoped onto the splined portion of said shaft and normally being disposed angularly in an active position blocking outward axial movement of said key out of said keyway whereby said retainer captivates said housing axially on said hub, a nut on the threaded end portion of said shaft and normally tightened to hold said retainer in said active position, said nut being operable when turned in a loosening direction to move axially away from said retainer to permit said retainer to be slid off of the splined portion of said shaft and then turned to a position enabling said key to be slid out of said keyway whereby said housing may be slipped axially off of said hub.

2. A marine propeller assembly as defined in claim 1 in which the threaded portion of said shaft is sufficiently long so that said nut remains on said threaded portion when said nut has moved axially sufficiently far to permit said retainer to be slid off of the splined portion of said shaft.

3. A marine propeller assembly adapted to be attached to a power-rotated shaft having an externally splined portion and having an externally threaded outer end portion located adjacent said splined portion, said assembly comprising a shock absorbing hub having (a) an internally splined tubular spindle adapted to be telescoped onto the splined portion of said shaft, (b) an outer sleeve telescoped over and spaced radially from said spindle, and (c) elastomeric material disposed between said spindle and said sleeve and transmitting torque from said spindle to said sleeve while absorbing torsional shock, said sleeve having an outer peripheral surface and an axially facing outer end, a plurality of angularly spaced and axially extending keyways formed in the outer surface of the sleeve and opening out of the outer end of the sleeve, a tubular propeller housing having a plurality of angularly spaced propeller blades, said housing having an inner peripheral surface with a plurality of angularly spaced, axially extending and radially inwardly projecting keys each having an axially facing outer end, said keys interfitting with said keyways to couple said housing for rotation with said sleeve, a retainer having an internally splined hole, said retainer normally being telescoped onto the splined portion of said shaft and normally being disposed in an active position covering the outer ends of said keys and said keyways to captivate said housing axially on said sleeve, a nut on the threaded end portion of said shaft and normally tightened to hold said retainer in said active position, said nut being operable when turned in a loosening direction to move axially away from said retainer to permit said retainer to be slid off of the splined portion of said shaft and onto the threaded portion thereof and then turned on the threaded portion to a releasing position uncovering the outer ends of said keys and said keyways to enable said housing to be slipped axially off of said sleeve while said nut and said retainer remain on said shaft.

4. A marine propeller assembly as defined in claim 3 in which said retainer is a disc having a plurality of angularly spaced ears, said ears being aligned angularly with said keys and keyways when said retainer is in said active position and being spaced angularly from said keys and said keyways when said retainer is in said releasing position.

5. A marine propeller assembly as defined in claim 3 further including means acting between said nut and said retainer and normally preventing said nut from turning on the threaded portion of said shaft, said means being selectively releasable to permit turning of said nut.

6. A marine propeller assembly as defined in claim 3 in which said elastomeric material is bonded to said spindle and said sleeve.

7. A marine propeller assembly adapted to be attached to a power rotated shaft having an externally splined portion, said assembly comprising a shock absorbing hub having an internally splined tubular spindle adapted to be telescoped onto the splined portion of said shaft, (b) an outer sleeve telescoped over and spaced radially from said spindle, and (c) a core of elastomeric material filling the space between said spindle and said sleeve, said core being bonded to said spindle and said sleeve and transmitting torque from said spindle to said sleeve while absorbing torsional shock, said spindle having a generally cylindrical outer peripheral surface, said sleeve having an inner peripheral surface defined at least in part by three equally spaced straight sides, said core having inner and outer peripheral surfaces conforming in shape to the outer and inner peripheral surfaces of said spindle and said sleeve, respectively, a tubular propeller housing having a plurality of angularly spaced propeller blades, means keying said housing for rotation with said sleeve, and selectively releasable means mounted on an end of said shaft for captivating said housing axially on said hub sleeve, and said releasable captivating means being rotatable from a first position captively retaining said housing axially on said hub and a second position for permitting removal of said housing from said hub while said captivating means remains mounted on said shaft.

8. A marine propeller assembly as defined by claim 7 in which the inner peripheral surface of said sleeve further includes three equally spaced arcuate sides, there being one arcuate side extending between adjacent ends of each pair of adjacent straight sides.

9. A marine propeller assembly as defined by claim 8 further including a plurality of angularly spaced and axially extending ribs on the outer peripheral surface of said spindle and embedded within the inner peripheral surface of said core.

10. A marine propeller assembly adapted to be attached to a power-rotated shaft having an externally splined portion, said assembly comprising a shock absorbing hub having (a) an internally splined tubular spindle adapted to be telescoped onto the splined portion of said shaft, (b) an outer sleeve telescoped over and spaced radially from said spindle, and (c) elastomeric material disposed between said spindle and said sleeve and transmitting torque from said spindle to said sleeve while absorbing torsional shock, said sleeve having an outer peripheral surface and an axially facing outer end, a tubular propeller housing having a plurality of angularly spaced propeller blades, said housing having an inner peripheral surface and being removably positionable onto the other peripheral surface of said sleeve, means keying said inner peripheral housing surface to said outer peripheral sleeve surface for enabling rotation of said housing with said sleeve, selectively releasable means mounted on an end of said shaft for captivating said housing axially on said hub sleeve, and said releasable captivating means being rotatable from a first position captively retaining said housing axially on said hub and a second position for permitting removal of said housing from said hub while said captivating means remains mounted on said shaft.

11. A marine propeller assembly as defined in claim 10 in which said outer peripheral sleeve surface and said inner peripheral housing surface are formed with a plurality of angularly spaced and axially extending keyways and keys.

12. A marine propeller assembly as defined in claim 11 in which said shaft has an externally threaded outer end portion located adjacent said splined portion, said captivating means including a retainer having an internally splined hole, said retainer normally being telescoped onto the splined portion of said shaft and normally being disposed in an active position covering the ends of said keys and said keyways to captivate said housing axially on said sleeve, a nut on the threaded end portion of said shaft and normally tightened to hold said retainer in said active position, said nut being operable when turned in a loosening direction to move axially away from said retainer to permit said retainer to be slid off of the splined portion of said shaft and onto the threaded portion thereof and then turned on the threaded portion to a releasing position uncovering the outer ends of said keys and said keyways to enable said housing to be slipped axially off of said sleeve while said nut and said retainer remain on said shaft.

13. A marine propeller assembly as defined in claim 12 in which said retainer is a disc having a plurality of angularly spaced ear, said ears being aligned angularly with said keys and said keyways when said retainer is in said active position and being spaced angularly from said keys and said keyways when said retainer is in said releasing position.

* * * * *